United States Patent [19]

Salatin et al.

[11] Patent Number: 5,236,995

[45] Date of Patent: Aug. 17, 1993

[54] POST-EXTENDED ANIONIC POLYURETHANE DISPERSION

[75] Inventors: Timothy D. Salatin, Farmington Hills; Anna M. Budde, Livonia, both of Mich.

[73] Assignee: BASF Corporation, Southfield, Mich.

[21] Appl. No.: 675,991

[22] Filed: Mar. 26, 1991

[51] Int. Cl.$^5$ .................. C08L 75/04; C08F 283/00; B05D 1/36

[52] U.S. Cl. .................... 524/591; 524/839; 524/840; 525/454; 525/459; 525/528; 427/402

[58] Field of Search ........ 524/591, 839, 840; 525/454, 459, 528; 427/402

[56] References Cited

U.S. PATENT DOCUMENTS

| | | | |
|---|---|---|---|
| 3,607,800 | 9/1971 | Sekmakas | 525/528 |
| 3,971,745 | 7/1976 | Carlson et al. | 525/454 |
| 4,208,311 | 6/1980 | Kinoshita et al. | 524/591 |
| 4,314,922 | 2/1982 | Lehner et al. | 525/454 |
| 4,399,241 | 8/1983 | Ting et al. | 525/454 |
| 4,482,671 | 11/1984 | Woo et al. | 525/454 |
| 4,522,851 | 6/1985 | Rosthauser | 524/591 |
| 4,822,685 | 4/1989 | Perez et al. | 427/407.1 |
| 4,826,894 | 5/1989 | Markusch et al. | 523/415 |
| 4,925,885 | 5/1990 | Rosthauser et al. | 524/539 |

*Primary Examiner*—John Kight, III
*Assistant Examiner*—Rabon Sergent
*Attorney, Agent, or Firm*—Frank G. Werner; Paul L. Marshall

[57] ABSTRACT

The present invention is directed to an aqueous anionic polyurethane dispersion, obtainable by
a) dispersing a polyurethane resin, having carboxylic acid groups, in water in the presence of a tertiary amine and
b) reacting the carboxylic acid groups on the polyurethane resin with an organic compound having at least two oxirane groups,
a basecoat containing said dispersions,
a method of coating a substrate with said basecoat and a coated substrate.

20 Claims, No Drawings

POST-EXTENDED ANIONIC POLYURETHANE DISPERSION

FIELD OF THE INVENTION

The present invention is directed to an aqueous anionic polyurethane dispersion as a basecoat for the multilayer coating of an automotive vehicle, more specifically it is directed to an anionic polyurethane dispersion post-extended with a compound containing at least two oxirane groups.

BACKGROUND OF THE INVENTION

Multi-layer coating systems were developed to satisfy a need for improved aesthetics of the coated substrate. By applying a relatively thin pigmented layer, termed the "basecoat", and then overcoating with a thicker, unpigmented layer, termed the "clearcoat", it was possible to achieve a glossy coating with an appearance of depth that has commonly been called "the wet look".

Multi-layer systems have been utilized to coat automobiles for a number of years, but the early development of these systems employed organic solvents. As environmental regulations became more stringent organic-borne systems became less desirable. The recent research emphasis in the area of multi-layer systems, especially basecoat systems, has focused on the development of water-borne systems for multi-layer coatings.

In particular, as organic-borne systems were formulated to require less and less organic solvent, becoming known in the industry as "high solids" coatings, it became obvious that the appearance, in particular the metallic effect of coatings containing flake pigments, suffered with the increase in solids. One of the opportunities which water-borne systems presents is that of improving on the metallic effect in a coating which complies with the restrictions on volatile organic content (VOC). Water-borne systems, however, resulted in other problems.

The requirements for the rheology of automotive coatings during application and curing steps are rigorous. In the past, rheology control agents have been relied on to provide desired application properties such as prevention of sagging, proper edge coverage, proper orientation of metallic flakes used in the coating, and so on. The range of rheology control agents suitable for automotive water-borne coatings is limited. In many cases the rheology control agents which can be used are difficult to disperse or show poor stability. Some rheology control agents which were successfully used in organic-borne coatings have been adapted for use in water-borne coatings, such as the microgels in the invention of Backhouse, U.S. Pat. No. 4,403,003. But these microgels have the deficiencies of being ardorous to make and difficult to stabilize.

The U.S. Pat. No. 4,822,685 discloses a method of forming a multilayered coating on a substrate, wherein an aqueous polyurethane dispersion is used comprising the reaction product of an isocyanate functional prepolymer and a polyamine. One disadvantage of this method is that even residual amounts of the polyamine in the coatings will cause yellowing and other undesirable effects.

U.S. Pat. No. 4,880,867 discloses an aqueous coating composition comprising a mixture of an acrylic dispersion and a polyurethane dispersion which can be applied by electrostatic spraying. But the acrylic polymer is prepared by solution polymerization at high molecular weights before dispersion. High levels of solvent are required to perform the solution polymerization at a reasonable viscosities. In order to obtain a low VOC coating it would be necessary to distill out the organic solvent that is in excess of what is needed for a stable dispersion. It is also necessary to add a commercial thickener to function as the rheology control agent to obtain the desired appearance of the film.

In addition, in a multilayer coating system it is necessary that the basecoat have "strike in" resistance. By "strike in" resistance is meant the ability of the basecoat to resist attack by the solvents in the topcoat composition. The strike in is a problem because the automobile manufacturers generally wish to apply the topcoat composition in a color plus clear system by a "wet-on-wet" technique. By this is meant that the basecoat composition is applied to the substrate followed by the topcoat composition and then a single baking step is utilized to cure the composite coating. The topcoat "strike in" to the basecoat is particularly undesirable since it adversely affects alignment of the metallic pigment. In highly pigmented colors the non-metallic pigment particles can provide the physical barrier to prevent strike in. But in silver and light metallic colors there is insufficient pigment to prevent strike in. The rheology control agent or a filler pigment must be used to prevent the strike in.

The post-extended anionic polyurethane dispersions of the present invention satisfy the needs for rheology control and strike in resistance in a waterborne coating. In particular, they provide excellent metallic flake orientation in a basecoat or one coat topcoat composition. In addition, they overcome the problems of difficulties of dispersion, instability, deleterious presence of emulsion polymerization surfactants, and high volatile organics content encountered with other compositions; as well as the complicated preparation procedures of sterically stabilized dispersions.

One object of the present invention is to provide an aqueous polyurethane dispersion in a basecoat in an automotive coating system which imparts excellent rheology control and enhances the metallic appearance of a basecoat with flake pigment. Another object of the present invention is to provide a basecoat comprising this aqueous polyurethane dispersion. Yet another object of the present invention is to provide a method of coating a substrate comprising the polyurethane dispersion and a substrate coated therewith.

SUMMARY OF THE INVENTION

The objects of the present invention are achieved with an aqueous anionic polyurethane dispersion, obtainable by
  a) dispersing a polyurethane resin having carboxylic acid groups, in water in the presence of a tertiary amine; and
  b) reacting the carboxylic acid groups on the polyurethane resin with an organic compound having at least two oxirane groups.

DETAILED DESCRIPTION OF THE INVENTION

Suitable polyurethane resins according to the invention are obtainable by reacting
  i) an organic compound having at least two reactive hydrogen functionalities and ii) an organic compound having at least one acid group and at least two active hydrogen functionalities with iii) a polyisocyanate.

Organic compounds (i) having at least two reactive hydrogen functionalities are well known in the art and described for example in U.S. Pat. No. 4,489,135 or 4,791,168, or 4,794,147 or 4,822,685 or 4,914,148. Suitable for the present invention are polyols having a hydroxyl functionality of 2 to 6, preferably of from about 2 to about 3 and a molecular weight of from about 62 to about 12,000. Examples for low molecular weight diols are ethylene glycol, 1,3-propanediol, 1,4-butanediol, neopentyl glycol, dimethylolcyclohexane and examples for higher functional alcohols are trimetylolethane, trimethylolpropane and pentaerythritol. Examples for higher molecular weight polyols are polyether di- or triols and polyester di- or triols with molecular weight of from about 400 to about 5,000.

Preferred polyols are polyester diols having a molecular weight of from 400 to 3,000 and low molecular weight diols having a molecular weight of from 62 to 400.

Examples of suitable diamines having primary and/or secondary amino groups include alkanolamines such as diethanol amine; alkylene diamines such as ethylene diamine, propylene diamine and hexamethylene diamine; branched polyamines such as tetraethylene pentamine, triethylene tetraamine, diethylene triamine, tris(2-aminoethyl)amine and various polyoxyalkylene amines which are commercially available under the trademark JEFFAMINE from Texaco.

Preferred diamines have secondary amino groups.

organic compounds (ii) have at least one acid group and at least two active hydrogen functionalities. Carboxylic acid, sulfonic acid, and phosphonic acid are examples of acid groups. Preferred is the carboxylic acid group. Hydroxyl groups and primary and/or secondary amino groups are examples for active hydrogen functionalities. Suitable examples of compounds (ii) are 2,2-dimethylolacetic acid, 2,2-dimethylolpropionic acid, 2,2-dimethylolbutyric acid and 2,2-dimethylolpentanoic acid. Examples of compounds containing amino groups include alpha, delta -diaminovaleric acid and 3,4-diaminobenzoic acid.

Preferred is 2,2-dimethylolpropionic acid.

Polyisocyanates (iii) are well known in the art and comprise aliphatic, cycloaliphatic and/or aromatic isocyanates containing at least 2 isocyanate groups per molecule.

Examples of aliphatic diisocyanates useful in the present invention are trimethylene diisocyanate, tetramethylene diisocyanate, pentamethylene diisocyanate, hexamethylene diisocyanate, propylene diisocyanate, ethylethylene diisocyanate, dimethylethylene diisocyanate, methyltrimethylene diisocyanate and trimethylhexane diisocyanate.

Examples of cycloaliphatic diisocyanates useful in the present invention include isophorone diisocyanate, cyclopentylene diisocyanate and the hydrogenation products of aromatic diisocyanates such as cyclohexylene diisocyanate, methylcyclohexylene diisocyanate and dicyclohexylmethane diisocyanate.

Suitable aromatic diisocyanates include phenylene diisocyanate, tolylene diisocyanate, xylylene diisocyanate, biphenylene diisocyanate, naphthylene diisocyanate and diphenylmethane diisocyanate or isomers or isomeric mixtures thereof.

Examples of triisocyanates useful in the present invention are the biuret of hexamethylene diisocyanate and water, the isocyanurate of hexamethylene diisocyanate and the product of addition of isophorone diisocyanate to trimethylolpropane.

Preferred polyisocyanates are aliphatic or cycloaliphatic diisocyanates. Particularly preferred is isophorone diisocyanate.

Components (i) (ii) and (iii) may be reacted in a "one-shot" or in a prepolymer process. In the preferred prepolymer process one part or one component of (i,) (ii) or mixtures thereof is reacted with the polyisocyanate (iii) to form an isocyanate prepolymer. The prepolymer is then reacted with another part or another component of (i), (ii) or mixtures thereof to form the final polyurethane.

In the "one shot" process all components (i) (ii) and (iii) are reacted together with or without the solvent to form the polyurethane. The reaction temperature may be up to about 150° C. but is preferably in the range of preferably 50 to about 130° C.

The molar ratio of the hydrogen functionality of component (i) and (ii) to the isocyanate group of (iii) is from about 0.8 to about 1.3, preferably from about 1.0 to about 1.3.

The molecular weight of the resulting polyurethane is from about 2,000 to about 30,000, preferably from about 8,000 to about 20,000, and most preferably from about 10,000 to about 14,000.

The component (ii) is used in a sufficient amount so that the acid number of the polyurethane is from about 5 to about 230 mg KOH/g, preferably from about 7 to about 156 mg KOH/g, most preferably from about 10 to about 80 mg KOH/g.

The reaction may be carried out in the presence of a catalyst such as organic tin compounds and/or tertiary amines. Organic solvents which do not contain Zerewitinoff active hydrogen may be added in order to keep the reactants in a liquid state, and improve the reaction temperature control. Suitable solvents include, for example, dimethyl formamide, esters, ethers such as diethylene glycol dimethyl ether, keto esters, ketones such as methyl ethyl ketone and acetone, ketones substituted with methoxy groups, such as methoxyhexanone, glycol ether esters, chlorinated hydrocarbons, aliphatic and alicyclic hydrocarbon pyrrolidones such as N-methyl pyrrolidone, hydrogenated furans, aromatic hydrocarbons and mixtures thereof. The quantity of solvent may vary within wide limits and should be sufficient to form a prepolymer solution having a suitable viscosity. It is in most cases sufficient to use from about 5 to about 50% by weight of solvent, preferably about 20 to about 40% by weight of solvent, based on the solids content.

Preferred solvents are ketones such as methyl ethyl ketone, methyl propyl ketone, and methyl isobutyl ketone.

Before dispersing the polyurethane in water it is at least partially neutralized with a tertiary amine or aminoalcohol. Suitable tertiary amines are, for example, trimethyl amine, triethyl amine, dimethyl aniline, diethyl aniline and N-methyl morpholine, and N-ethyl morpholine. Suitable aminoalcohols are dimethyl ethanol amine and triethanol amine. After neutralization, the polyurethane is diluted with deionized water under agitation to yield a finely divided dispersion.

An organic compound having at least two oxirane groups is added to the dispersion. Suitable compounds are di- and triglycidyl ether of diols, triols and bisphenols or derivatives of cyclohexene oxides. Examples are diglycidyl ethers of 1,4-butanediol, neopentyl glycols, cyclohexane dimethanols, diethylene glycol, polyethylene glycol, dipropylene glycol, polypropylene glycol, 2,2,4-trimethyl-1,3-pentanediol, 1,6-hexanediol, bisphenol A and resorcinol; and triglycidyl ethers of trimethylol propane, trimethylol ethane and glycerine.

Suitable derivatives of cyclohexene oxides have two or three epoxy groups and are described for example in a brochure Cycloaliphatic Epoxide Systems from Union Carbide Chemicals & Plastics Technology Corporation, published Oct. 1989, which is herewith incorporated by reference. The compounds described therein are ERL-4221, ERL-4299, ERL-4234. Union Carbide has also disclosed another cyclohexeneoxide derivative, which is a triepoxide, under the trade name ERLX-4359, which has a mol weight of 406.46.

Preferred compounds are diglycidyl ethers of 1,4-butanediol, cyclohexane dimethanols, polypropylene glycol, bisphenol A; the triglycidyl ether trimethylol propane and derivatives of cyclohexene oxides.

The molar ratio of carboxylic acid groups to epoxide groups is from about 20:1 to about 1:1, preferably from about 8:1 to about 1.04:1.

The reaction between the carboxylic acid groups and the oxirane groups is carried to from about 30% to about 100% of the theoretical completion, preferably from about 50% to about 100%, most preferably from about 60% to about 100% of the theoretical completion.

The reaction temperature is not particularly important, but it is preferable to be at about 80 to about 100° C. to allow the reaction to proceed with an economy of time.

The aqueous polyurethane dispersion described above can be formulated in a water-borne basecoat along with a grind resin, a crosslinking agent, pigments, flake pigments such as aluminum and/or mica particles, basifying agents, water, fillers, surfactants, stabilizers, platicizers, wetting agents, dispersing agents, adhesion promoters, defoamers, catalysts and optionally, additional polymers or rheology control agents, among other ingredients.

In general, an aqueous polyurethane dispersion formulated as described herein, is mixed with a crosslinking agent, water, a portion of an organic solvent, aluminum and/or mica particles, or other pigments which may be dispersed with the aid of a grind resin.

The aqueous polyurethane dispersions can be utilized as the principal or major resin. They may also be used in conjunction with another aqueous resin dispersion which is the major resin. In general, the aqueous polyurethane dispersion comprises between about 10 and about 80% by weight of the total solids present in the basecoat composition.

A compound which functions as a crosslinker or crosslinking agent has two or more functional groups which are reactive with the functional groups on the resin. The crosslinker may be monomeric or polymeric. The polyurethane dispersion of the present invention may be used with a crosslinker which can react with either hydroxyl or carboxyl groups. Examples of crosslinkers which are reactive with hydroxyl groups are aminoplast resins, isocyanate or blocked isocyanate-containing compounds. One preferred crosslinker is an aminoplast resin. Preferred aminoplast resins are aldehyde condensation products of melamine, urea, and similar compounds. Products obtained from the reaction of formaldehyde with melamine, urea or benzoguanamine are most common and are preferred. However, condensation products of other amines and amides can also be employed, for example, aldehyde condensates of triazines, diazines, triazoles, guanidines, guanamines and alkyl- and aryl-substituted ureas and alkyl- and aryl-substituted melamines. Some examples of such compounds are N,N-dimethylurea, benzourea, dicyandiamide, formoguanamine, acetoguanamine, ammeline, 2-chloro-4,6-diamino-1,3,5-triazine, 6-methyl-2,4-diamino-1,3,5-triazine, 3,5-diamino-triazole, triaminopyrimidine, 2-mercapto-4,6-diaminopyrimidine, 2,4,6-triethyltriamino-1,3,5-triazine, and the like.

While the aldehyde employed is most often formaldehyde, other similar condensation products can be made from other aldehydes, for example, acetaldehyde, crotonaldehyde, acrolein, benzaldehyde, furfural, and others.

The amine-aldehyde condensation products contain methylol or similar alkylol groups, and in most instances at least a portion of these alkylol groups are etherified by a reaction with an alcohol to provide organic solvent-soluble resins. Any monohydric alcohol can be employed for this purpose, including such alcohols as methanol, ethanol, propanol, butanol, pentanol, hexanol, heptanol and others, as well as benzyl alcohol and other aromatic alcohols, cyclic alcohols for example cylohexanol, monoethers of glycols such as Cellosolves and Carbitols TM (Union Carbide), and halogen-substituted or other substituted alcohols, such as 3-chloropropanol. The preferred amine-aldehyde resins are etherified with methanol or butanol.

An example of a crosslinker which is reactive with carboxyl groups is oxirane-containing compound. These compounds may be monomers or may be, for example, functional acrylics or epoxy resins.

In addition to hydroxyl and carboxyl groups, the polyurethane of the invention may include the residue of a monomer with a different functionality, or may be modified in such a way as to introduce another functionality onto the polymer. The crosslinker is then chosen to be reactive with at least one of the funtionalities present on the polymer.

A suitable grind resin may be used to incorporate pigments into the basecoat by known methods of producing pigment grind pastes.

The dye stuffs or pigments may be inorganic or organic, for example, graphite, carbon black, zinc chromate, strontium chromate, barium chromate, lead chromate, lead cyanide, titanium dioxide, zinc oxide, iron oxide, cadmium sulfide, iron oxide, aluminum flakes, mica flakes, zinc sulfide, phthalocyanine complexes, naphthol red, carbazole violet, perylene reds, quinacridones and halogenated thioindigo pigments, among others.

The preferred flake pigments are aluminum metal flakes and micas. Preferred aluminum flake pigments are available from Silberline Corp., Lansford, Pennsylvania or from Eckart Werke, Guentersthal, Germany. Preferred micas are available from the Mearl Corp., New York, NY and EM Chemicals, Hawthorne, NY. In a preferred embodiment of the present invention standard grade aluminum stabilized with phosphate ester is used. The flake pigments may also be mixed with non-flake pigments, but these are to be carefully chosen so as not to diminish the desired metallic effect.

The resins used in the basecoat are dispersed in deionized water. It is preferred that the deionized water have conductance readings of less than 13 microohms-1 to prevent gassing caused by the reaction of aluminum with water. Deionized water is also chosen to avoid salts that naturally occur in tap water. Other solvents may also be employed with the deionized water. An especially preferred solvent is ethylene glycol monobutyl ether (Butyl Cellosolve TM) which aids mixing, formulating and dispersing pigment in the basecoat. Other solvents can also be used, for example, low-boiling mono and polyhydric alcohols, ethers, esters, ketones and other organics. The organic solvent, which comprises at most about 80% of the basecoat, and preferably comprises about 10% to 20% by weight of the basecoat, including water, may be selected to promote the dispersibility of individual components in the final basecoat and for its low volatility characteristics.

The final basecoat shows excellent rheology control. However, a rheology control agent could be optionally incorporated into the basecoat. Rheology control agents which can be used in embodiments of the present invention include the fumed silica compounds and the bentonite clays. Preferred fumed silica compounds are the hydrophobic silica compounds, for example Aerosil R972, available from DeGussa Corporation, Frankfurt, Germany. Another rheology control agent which may be used, and in certain basecoats, may be preferred as a synthetic sodium lithium magnesium silicate hectorite clay. An example of one such clay is Laponite RD, available from Laporte, Industries, Ltd., Saddlebrook, N.J. In certain preferred embodiments rheology control agents are mixed. The rheology control agent, when it is included, generally comprises about 0.1 to about 20 percent by weight of the basecoat and preferably comprises between about 1 percent and about 5 percent by weight of the final basecoat composition.

The final basecoat is adjusted to a ph of 7.6–7.8 with a tertiary amine, for example, N-ethylmorpholine. Viscosity may be adjusted using deionized water.

The solid content of the final aqueous basecoat is from about 10 to about 60% by weight, preferably from about 15 to about 45% by weight.

A coated substrate of the present invention comprises at least one coating layer adhered to a substrate. In general, the substrate which is coated can be metal, plastic, wood, ceramic, and so on. Preferably the substrate is metallic or plastic, and most preferably the substrate is an automotive body. The substrate is preferably "precoated" (i.e. coated with primers or any other desired coating which need not incorporate the polyurethanes of the present invention) before a coating formulation of the present invention is applied thereto.

The basecoat described hereinabove can be applied to the prepared metal or plastic substrate in one or two coats using for example an air atomizer (Binks Model 60 spray gun, available from Binks Manufacturing Corporation, Franklin Park, Ill.)., or by using other conventional spraying means. The basecoat may also be applied electrostatically.

After being deposited, the basecoat is flash dried within a temperature range of from about room temperature to about 145° F. for between about 30 seconds and about 10 minutes using warm air blowing at a relative humidity of about 5 to about 40%. The preferred flash temperature is about 120° F. which is carried out for preferably between about 1 and about 5 minutes. The flash conditions described herein result in about 90 to about 95% of the solvents including water being flashed from the basecoat in this short period of time.

After the first basecoat is deposited, a second basecoat can be deposited over the first without drying (flash off), or alternatively, a clearcoat may be deposited over the flashed basecoat. Any number of clearcoats known in the art may be used. Any known unpigmented or other transparently pigmented coating agent is in principle suitable for use as a clearcoat. A typical clearcoat composition contains about 30 to about 70% film forming resin and of about 30 to about 70% volatile organic solvent.

After the clearcoat is coated onto the basecoat layer, the multi-layer coating is then baked to crosslink the multi-layer coating and to drive the small amount of residual water and organic solvent from the multi-layered coating. A preferred baking step involves heating the coated substrate for a period of about 10 to about 60 minutes at a temperature of between about 150 and about 300° F. The baking step cures the coating to a hard, durable film.

Compositions of the present invention may be used to produce coatings which do not necessarily require the addition of external rheology control agents. Alternatively, the invention may be added at lower levels to a coating composition with a different principal polymer to function as a rheology control agent.

The basic criteria which are considered to be of greatest importance in evaluating the quality of metallic effect in a coating are: (1) the brightness when the coating is viewed at an angle of 90° to the plane of the surface, (2) the brightness of the coating when viewed at oblique angles, and (3) the evenness of the metallic effect (i.e., lack of mottle). Properties (1) and (2) can be measured by goniphotometry. For example, a method has been developed at BASF which uses a Datacolor model GPX-111 goniospectrophotometer. This instrument has a fixed incident light angle of 45°. The detector for the reflection intensity can be varied between 20° and 70° from the specular reflectance angle. It was determined that better metallic effect can be correlated to a greater decrease in the reflected intensity at low angles from specular. A relation was developed which adequately differentiated between observed metallic effects of standard panels. This relation is described by the equation $$C = [(L^*25° - L^*45°)/(L^*45° - L^*70°)] \times 100$$

where L* indicated the light intensity in color space at the angle of measurement.

This measurement is quantitative and reproducible. It will be used in the examples to indicate the degree of metal effect evident in the examples.

EXAMPLES

Example 1

Anionic Aqueous Polyurethane Dispersion

The polyurethane resin was prepared by loading a suitable reactor with 700.0 g (1.000 equivalents) polyester[1], 14.2 g (0.273 equivalents) neopentyl glycol, 43.0 g (0.642 equivalents) dimethylolpropionic acid, 244.8 g (2.203 equivalents) isophorone diisocyanate, and 300 g methyl isobutyl ketone. The contents of the reactor were heated to reflux (130° C.). The reaction was allowed to proceed at reflux for four hours and fifteen minutes. The measurement of residual isocyanate indicated then that all the hydroxyl groups had been consumed. The heat was turned off and 29.8 g (0.284 moles)

diethanolamine were added. After stirring for five minutes, 28.6 g N,N-dimethylethanolamine (0.321 eq.) and 19.8 g deionized water were added. After mixing, 2400.0 g deionized water were added over the period of about 15 minutes. Heat was then applied and distillate was removed until the temperature reached 99.5° C. The batch was then cooled and 240.8 g butanol was added. The weight non-volatiles (NV)=28.9, and acid number per non-volatile (AN/NV)=20.2 mg KOH/ g NV.

Example 2

Post-Extended Anionic Aqueous Polyurethane Dispersion

The prepared polyurethane dispersion described in Example 1 was then post-extended by loading 505.9 g of the polyurethane dispersion (146.0 g NV, 0.0526 equivalents acid) to a suitable reactor and adding 5.8 g (0.033 eq.) DER 736[2]. The mixture was heated to 90° C. The temperature was held there for about three hours, after which the measured AN/NV of 9.2 mg KOH/g NV indicated the epoxy/acid reaction was 84% theoretically complete. The non-volatiles were measured at 30.1%.

Example 3

Post-Extended Anionic Aqueous Polyurethane Dispersion

The prepared polyurethane dispersion described in Example 1 was then post-extended by loading 504.0 g of the polyurethane dispersion (145.4 g NV, 0.0523 equivalents acid) to a suitable reactor and adding 8.8 g (0.050 eq.) DER 736[2]. The mixture was heated to 90° C. The temperature was held there for about two and a half hours, after which the measured AN/NV of 4.5 mg KOH/g NV indicated the epoxy/acid reaction was 80% theo. complete. The nonvolatiles were measured at 30.8%.

Example 4

Anionic Aqueous Polyurethane Dispersion

The polyurethane resin was prepared by loading a suitable reactor with 700.0 g (1.000 equivalents) polyester[1], 20.2 g (0.389 equivalents) neopentyl glycol, 43.0 g (0.642 equivalents) dimethylolpropionic acid, 244.5 g (2.201 equivalents) isophorone diisocyanate, and 300 g methyl isobutyl ketone. The contents of the reactor were heated to reflux (131° C.). The reaction was allowed to proceed at reflux for four hours. The measurement of residual isocyanate indicated then that all the hydroxyl groups had been consumed. The heat was turned off and the batch was cooled to about 80° C. 19.0 g (0.181 moles) diethanolamine were added. After stirring for five minutes, 28.6 g N,N-dimethylethanolamine (0.321 eq.) and 18.1 g deionized water were added. After mixing, 2499.0 g deionized water were added over the period of about 15 minutes. Heat was then applied and the distillate was removed until the temperature reached 99.5° C. The batch was cooled and 239.6 g butanol were added. The weight non-volatiles (NV)=28.0, and acid number per non-volatile (AN/NV)=19.0 mg KOH/ g NV.

Example 5

Post-Extended Anionic Aqueous Polyurethane Dispersion

The prepared polyurethane dispersion described in Example 4 was then post-extended by loading 503.0 g of the polyurethane dispersion (140.8 g NV, 0.0457 equivalents acid) to a suitable reactor and adding 5.6 g (0.0318 eq.) DER 736[2] and 197.1 g deionized water. The mixture was heated to 90° C. The temperature was held there for about six hours, after which the measured AN/NV of 9.0 mg KOH/g. NV indicated the epoxy/acid reaction was 70% theo. complete. The non-volatiles were measured at 21.0%

Example 6

Post-Extended Anionic Aqueous Polyurethane Dispersion

The prepared polyurethane dispersion described in Example 4 was then post-extended by loading 509.1 g of the polyurethane dispersion (142.5 g NV, 0.0482 equivalents acid) to a suitable reactor and adding 5.7 g (0.0368 eq.) Heloxy 5048[3] and 175.0 g deionized water. The mixture was heated to 90° C. The temperature was held there for about four and a half hours, after which the measured AN/AV of 5.0 mg KOH/g. NV indicated the epoxy/acid reaction was 95% theo. complete. The non-volatiles were measured at 21.9%.

Example 7

Post-Extended Anionic Aqueous Polyurethane Dispersion

The prepared polyurethane dispersion described in Example 4 was then post-extended by loading 351.0 g of the polyurethane dispersion (102.5 g. NV, 0.0347 equivalents acid) to a suitable reactor and adding 4.1 g (0.0304 eq.) Heloxy 68[4] and 100.0 g deionized water. The mixture was heated to 90° C. The temperature was held there for about five hours, after which the measured AN/NV of 4.9 mg KOH/g. NV indicated the epoxy/acid reaction was 84% theo. complete. The non-volatiles were measured at 23.3%.

Example 8

Post-Extended Anionic Aqueous Polyurethane Dispersion

The prepared polyurethane dispersion described in Example 4 was then post-extended by loading 351.0 g of the polyurethane dispersion (98.0 g NV, 0.0332 equivalents acid) to a suitable reactor and adding 3.9 g (0.0229 eq.) Heloxy 107[5] and 99.7 g deionized water. The mixture was heated to 90° C. The temperature was held there for about five hours, after which the measured AN/NV of 8.2 mg KOH/g. NV indicated the epoxy/acid reaction was 80% theo. complete. The non-volatiles were measured at 23.1%.

Example 9

Post-Extended Anionic Aqueous Polyurethane Dispersion

The polyurethane resin was prepared by loading a suitable reactor with 476.7 g (0.6807 equivalents) polyester[1], 65.5 g (0.9776 equivalents) dimethylolpropionic acid, 197.3 g (1.7759 equivalents) isophorone diisocyanate, and 333.3 g methyl isobutyl ketone. The contents of the reactor were heated to reflux (124° C.).

The reaction was allowed to proceed at reflux for five hours. The measurement of residual isocyanate indicated then that all the hydroxyl groups had been consumed. The heat was turned off and the batch was cooled to about 73° C. 14.0 g (0.133 moles) diethanolamine were added. After stirring for five minutes, 43.5 g (0.489 eq.) N,N-dimethylethanolamine were added. After mixing, 2112.7 g deionized water were added over the period of about 15 minutes. Heat was then applied and the distillate was removed until the temperature reached 99.5° C. The batch was cooled and 171.2 g butanol were added. The weight non-volatiles (NV)=29.3, and acid number per non-volatile (AN/NV)=38 mg KOH/ g NV.

The prepared polyurethane dispersion was then post-extended by loading 1023.0 g of the polyurethane dispersion (300.0 g NV, 0.203 equivalents acid) to a suitable clean reactor and adding 30.0 g (0.194 eq.) Heloxy 5048[3]. The mixture was heated to 89° C. and the temperature was maintained at about 89° C. for about two hours. A total of 715.7 g deionized water was added during the reaction and after the reaction to keep the batch fluid. The measured AN/NV of 6.0 mg KOH/g. NV indicated the epoxy/acid reaction was 87% theo. complete. The non-volatiles were measured at 15.4%.

Example 10

Post-Extended Anionic Aqueous Polyurethane Dispersion

The polyurethane resin was prepared by loading a suitable reactor with 844.5 g (1.255 equivalents) polyester[6], 114.7 g (1.712 equivalents) dimethylolpropionic acid, 29.8 g (0.573 equivalents) neopentyl glycol, 420.0 g (3.784 equivalents) isophorone diisocyanate, 113.2 g methyl ethyl ketone, and 281.4 g methyl amyl ketone. The contents of the reactor were heated to reflux (127° C.). the reaction was allowed to proceed at reflux for about four hours. A mixture of 150.0 g methyl ethyl ketone and 150.0 g methyl amyl ketone were added. After another hour, the measurement of residual isocyanate indicated then that all the hydroxyl groups had been consumed. 32.7 g (0.732 equivalents) trimethylolpropane were added and the reaction was allowed to proceed for an hour. The batch was cooled and 153.0 g ethylene glycol monobutyl ether followed by 30.5 g N-N-dimethylethanolamine and 141.3 g deionized water were added. After mixing, 2400 g deionized water were added over 45 minutes. The weight non-volatiles (NV)=30.6, and acid number per non-volatile (AN/NV)=34.3 mg KOH/ g NV.

The prepared polyurethane dispersion was then post-extended by loading 1500.0 g of the polyurethane dispersion (459.6 g NV, 0.281 equivalents acid) to a suitable clean reactor and adding 19.1 g (0.108 eq.) DER 736[2] and 300.0 g deionized water. The mixture was heated to 91° C. and the temperature was maintained at about 91° C. for about seven and a half hours. The measured AN/NV of 23.6 mg KOH/g. NV indicated the epoxy/acid reaction was 74% theo. complete. The non-volatiles were measured at 26.1%.

Example 11

Post-Extended Anionic Aqueous Polyurethane Dispersion

The polyurethane resin was prepared by loading a suitable reactor with 844.5 g (1.255 equivalents) polyester[6], 114.7 g (1.712 equivalents) dimethylol propionic acid, 29.8 g (0.573 equivalents) neopentyl glycol, 420.0 g (3.784 equivalents) isophorone diisocyanate, 263.2 g methyl ethyl ketone, and 431.4 g methyl amyl ketone. The contents of the reactor were heated to 110° C. The reaction was allowed to proceed 110° C. for about eight hours. The measurement of residual isocyanate indicated then that all the hydroxyl groups had been consumed. 32.7 g (0.732 equivalents) trimethylol propane were added and the reaction was allowed to proceed for three and a half hours. The batch was cooled and 153.0 g ethylene glycol butyl ether followed by 30.5 g N,N-dimethylethanolamine and 141.3 g deionized water were added. After mixing, 2400 g deionized water were added over one and a half hours. The weight non-volatiles (NV)=29.7, and acid number per non-volatile (AN/NV)=36.9 mg KOH/ g NV.

Example 12

Anionic Aqueous Polyurethane Dispersion

The polyurethane resin was prepared by loading a suitable reactor with 787.0 g (771.3 g NV, 1.102 equivalents) polyester[7], 110.8 g (1.654 equivalents) dimethylol propionic acid, 17.6 g (0.338 equivalents) neopentyl glycol, 369.5 g (3.326 equivalents) isophorone diisocyanate, and 596.0 g methyl isobutyl ketone. The contents of the reactor were heated to reflux (124° C.). The reaction was allowed to proceed at reflux for about four hours. The measurement of residual isocyanate indicated then that all the hydroxyl groups had been consumed. The heat was turned off and 15.4 g (0.146 moles) diethanolamine were added. After stirring, 37.0 g N,N-dimethylethanolamine (0.416 eq.) and 21.5 g deionized water were added. After mixing, 2830 g deionized water were added. Heat was then applied and the distillate was removed until the temperature reached 99.5° C. The batch was cooled and 299.7 g butanol were added. The weight non-volatiles (NV)=33.1, and acid number per non-volatile (AN/NV)=36.6 mg KOH/g NV.

The prepared polyurethane dispersion was then post-extended by loading 1650.4 g of the polyurethane dispersion (546.1 g NV, 0.3562 equivalents acid) to a suitable clean reactor and adding 43.9 g (0.2494 eq.) DER 736[2]. The mixture was heated to 90.C and the temperature was maintained at about 90° C. for about five and a half hours. A total of 369.2 g deionized water was added during the reaction to keep the batch fluid. The measured AN/NV of 15.8 mg KOH/g NV indicated the epoxy/acid reaction was 76% theo. complete. The non-volatiles were measured at 29.3%.

Example 13

Anionic Aqueous Polyurethane Dispersion

A suitable reactor was loaded with 630.0 g (0.92 eq.) polyester[8], 38.3 g (0.572 eq.) dimethylol propionic acid, 12.8 g (0.246 eq.) neopentyl glycol, 220.5 g (1.985 eq.) isophorone diisocyanate, 131.9 g methyl propyl ketone and 52.1 g methyl ethyl ketone. The mixture was heated under inert gas to 107° C. The temperature was maintained at 107° C. for four hours at which time the isocyanate content was determined to be 0.24 meq./g. 38.2 g (0.853 eq.) trimethylol propane. The reaction was allowed to proceed for one hour. The inert gas and heat were then turned off and the polyurethane solution was cooled at 100° C. A mixture of 25.5 g dimethylethanolamine and 111.0 g butanol was added. A dispersion was then formed with the addition of 2196.2 g deionized water. The measured weight non-volatiles (NV) was 27.1% and the measured acid number (AN) was 19 mg. KOH per g NV.

Example 14

Anionic Aqueous Polyurethane Dispersion

A suitable reactor was loaded with 119 parts polyester[1], 7.32 parts dimethylol propionic acid, 2.1 parts neopentyl glycol, 41 parts isophorone diisocyanate, 13.3 parts methyl ethyl ketone and 32.2 parts methyl amyl ketone. The mixture was heated under inert gas to reflux (132° C.). The reflux was maintained for three hours at which time the isocyanate content was determined to be 0.24 meq./g. The batch was cooled to 100° C. and 5.3 parts diethanolamine were added. After twenty minutes the inert gas was turned off and a mixture of 3.4 parts dimethylethanolamine and 16 parts deionized water was added. 17.9 parts isopropanol were added. A dispersion was then formed with the addition of 441 parts deionized water. The measured weight non-volatiles (NV) was 25.1%.

Example 15

Anionic Aqueous Polyurethane Dispersion

A suitable reactor was loaded with 61 parts polyester[1], 3.77 parts dimethylolpropionic acid, 1.1 parts neopentyl glycol, 21 parts isophorone diisocyanate, and 25 parts methyl isobutyl ketone. The mixture was heated under inert gas to 130° C. The reflux was maintained for four hours at which time the isocyanate content was determined to be 0.19 meq./g. 2.81 parts trimethylolpropane were added. The reaction was allowed to proceed for one half hour. The inert gas and heat were then turned off and the polyurethane solution was cooled to 100° C. A mixture of 2.5 parts dimethylethanolamine and 10 parts deionized water were added. The batch was then heated and a total of 47 parts distillate was removed. The heat was then turned off and 113 parts deionized water and 21 parts butanol were added. The measured wight non-volatiles (NV) was 22.8%.

Preparation and Use of Basecoats

Examples 16–24

In these examples the anionic aqueous polyurethane dispersion was used as the principal resin without any additional rheology control agent.

| Ingredient (% NV) | 16 | 17 | 18 | 19 | 20 | 21 | 22 |
|---|---|---|---|---|---|---|---|
| Hydrolac Obron W8487[9] (65) | 19.7 | 19.7 | 19.7 | 19.7 | 19.7 | 19.7 | 24.5 |
| Ethylene glycol monobutyl ether | 16.5 | 16.5 | 16.5 | 16.5 | 16.5 | 16.5 | 20.4 |
| 2-Hexyloxyethyl phosphate ester[10] solution (15.0 in Ethylene glycol monobutyl ether) (15) | 3.8 | 3.8 | 3.8 | 3.8 | 3.8 | 3.8 | 4.8 |
| Cymel 327[11] (90) | 33.3 | 33.3 | 33.3 | 33.3 | 33.3 | 33.3 | 37.2 |

The above materials were mixed together. Next were added:

| | | | | | | | |
|---|---|---|---|---|---|---|---|
| Example 2 (30.13) | 149.4 | | | | | | |
| Example 3 (30.82) | | 146.0 | | | | | |
| Example 5 (21.01) | | | 214.2 | | | | |
| Example 6 (21.86) | | | | 205.8 | | | |
| Example 7 (23.32) | | | | | 193.0 | | |
| Example 8 (23.1) | | | | | | 194.8 | |
| Example 9 (15.4) | | | | | | | 324.5 |

The pH of the paints were adjusted with N-ethyl morpholine and the viscosities were adjusted with deionized water.

| | | | | | | | |
|---|---|---|---|---|---|---|---|
| pH | 8.12 | 8.33 | 8.05 | 8.31 | 8.36 | 8.26 | 9.09 |
| viscosity, #2 Fischer | 48" | 47" | 53" | 19" | 12" | 19" | 37" |

Panels were sprayed to a dry basecoat thickness of 0.5–0.7 mils. The panels were flashed for 3–5 minutes in a forced air oven set at 120° F. The panels were baked for 30 minutes in a 250° F. oven. The panels were then judged for metallic effect:

| | | | | | | | |
|---|---|---|---|---|---|---|---|
| C value, goniospectrophotometer | 172 | 172 | 172 | 180 | 172 | 172 | 210 |

Examples 23 and 24

Aluminum Slurry

The following materials were mixed to form the aluminum slurry:

| | |
|---|---|
| Aluminum Pigment (Silberline SS-5251 AR) (62% NV) | 207.2 |
| Ethylene glycolmonobutyl ether | 312.2 |
| 2-Hexyloxyethyl phosphate ester[10] solution (15.0% in Ethylene glycol monobutyl ether) | 38.3 |
| Isopropanol | 321.4 |
| Cymel 327[11] (90% NV) | 256.1 |

The following materials were mixed together in order:

| Ingredient (% NV) | 23 | 24 |
|---|---|---|
| Aluminum Slurry | 172.0 | 172.0 |
| Example 10 (26.1) | 237.0 | — |
| Example 11 (29.7) | — | 208.4 |
| Dimethylethanolamine (ml) | 1.7 | 2.5 |
| Deionized water | 400.6 | 239.0 |
| pH | 8.35 | 8.09 |
| viscosity, #2 Fisher | 38" | 36" |

Panels were sprayed to a dry basecoat thickness of 0.5–0.7 mils. The flashed for 3–5 minutes in a forced air oven set at 120° F. and then coated with a solvent borne clearcoat. The panels were baked for 30 minutes in a 250° F. oven. The panels were then judged for metallic effect. Example 23 had better metallic effect than Example 24.

Examples 25-27

In these examples the invention was used as the principal resin with use of an inorganic thickener.

Thickener Solution

A 2% by weight dispersion in deionized water of Laponite RD (available from Laporte, Inc., Saddlebrook, N.J.), a synthetic sodium lithium magnesium silicate hectorite clay, was prepared with stirring.

| Ingredient (% NV) | 25 | 26 | 27 |
|---|---|---|---|
| Thickener solution (2) | 100 | — | 200 |
| Cymel 327[11] (90) | 22.2 | 37.4 | 22.2 |
| Ethylene glycol monobutyl ether | 9.9 | — | 9.9 |

The above materials were mixed together. Next were added:

| | | | |
|---|---|---|---|
| Example 12 (29.3) | 273.0 | 460.2 | — |
| Example 13 (27.1) | 295.2 | — | — |

The following materials were mixed to form the aluminum slurry and then were added to the resin mixture:

| | | | |
|---|---|---|---|
| Hydrolac W8487[9] (65) | 29.2 | 49.2 | 29.2 |
| 2-Hexyloxyethyl phosphate ester[10] solution (15.0 in ethylene glycol monobutyl ether) (15) | 5.7 | 9.6 | 5.7 |
| Ethylene glycol monobutyl ether | 14.9 | 41.8 | 14.9 |

The pH was adjusted with N-ethyl morpholine and the viscosity with deionized water:

| | | | |
|---|---|---|---|
| pH | 7.97 | 8.03 | 8.16 |
| visc., #2 Fisher | 39" | 44" | 45" |

Panels were sprayed to a dry basecoat thickness of 0.5–0.7 mils. The panels were flashed for 3–5 minutes in a forced air oven set at 120° F. and then coated with a solvent borne clearcoat. The panels were baked for 30 minutes in a 250° F. oven. The panels were then judged for metallic effect:

| | | | |
|---|---|---|---|
| C value, goniospectrophotometer | 205 | 195 | 180 |

Examples 28-30

In these examples the invention was used as a rheology control additive with another principal resin.

Aluminum Slurry

The following materials were mixed to form the aluminum slurry:

| | |
|---|---|
| Obron Hydrolac W8487[9] (65% NV) | 110.2 |
| Cymel 327[11] (90% NV) | 167.4 |
| Ethylene glycol monobutyl ether | 91.8 |
| 2-Hexyloxyethyl phosphate ester[10] solution (15.0 in ethylene glycol monobutyl ether) (15% NV) | 21.6 |

| Ingredient (% NV) | 28 | 29 | 30 |
|---|---|---|---|
| Example 14 (25.1) | 159.4 | 119.5 | — |
| Example 9 (15.4) | 69.4 | 129.8 | — |
| Example 15 (22.8) | — | — | 219.6 |
| Aluminum Slurry | 86.9 | 86.9 | 86.9 |

The pH of the paints were adjusted with N-ethyl morpholine and the viscosities were adjusted with DI water.

| | | | |
|---|---|---|---|
| pH | 7.92 | 7.61 | 8.29 |
| viscosity, #2 Fisher | 36" | 33" | 30" |

Panels were sprayed to a dry basecoat thickness of 0.5–0.7 mils. The panels were flashed for 3–5 minutes in a forced air oven set at 120° F. and then clearcoated with a solvent borne clearcoat. The panels were baked for 30 minutes in a 250° F. oven. The panels were then judged for metallic effect:

| | | | |
|---|---|---|---|
| C value, goniospectrophotometer | 172 | 180 | <150* |

*unacceptable appearance due to strike-in

1. The polyester was the reaction product of 148.5 parts dimer fatty acid (Empol 1010 from Emergy Group, Henkel Corporation, Cincinnati, OH), 148.5 parts adipic acid and 183 parts 1,6-hexanediol. The measured NV=98.6%, AN/NV=7.2mg KOH per g NV.
2. DER 736 is the diglycidyl ether of polypropylene oxide with weight per epoxide (WPE)=170–205. (Dow Chemical Co., Midland, Mich.
3. Heloxy 5048 is the triglycidyl ether of timethylolpropane with a weight per epoxide of 145–165. It is available from Rhone-Poulenc, Performance Resins & Coatings Division, Louisville, Ky.
4. Heloxy 68 is the diglycidyl ether of neopentyl glycol with a weight per epoxide of 130–140. It is available from Rhone-Poulenc, Performance Resins & Coatings Division, Louisville, Ky.
5. Heloxy 107 is the diglycidyl ether of cyclohexanedimethanol with a weight per epoxide of 155–165. It is available from Rhone-Poulenc, Performance Resins & Coatings Division, Louisville, Ky.
6. The polyester was the reaction product of 562.9 parts dimer fatty acid (Empol 1010 from Emery Group, Henkel Corporation, Cincinnati, OH), 97.2 parts neopentyl glycol, and 81.4 parts cyclohexanedimethanol. The theoretical weight per hydroxyl was 673.
7. The polyester was the reaction product of 302.5 parts dimer fatty acid (Empol 1010 from Emery Group, Henkel Corporation, Cincinnati, OH), 86.0 parts isophthalic anhydride, and 160.5 parts 1,6-hexanediol. The theoretical weight per hydroxyl was 714.
8. The polyester was the reaction product of 302.5 parts dimer fatty acid (Empol 1010 form Emery Group, Henkel Corporation, Cincinnati, OH), 86.0 parts isophthalic anhydride, and 160.5 parts 1.6- hexanediol. The theoretical weight per hydroxyl was 680.
9. Obron Hyrolac W8487 was obtained from Eckart Werke, Guentersthal, Germany and is an aluminum flake pigment which is 65% NV by weight and has been chemically passified for use in water.
10. 2-Hexyloxyethyl phosphate ester is available as Phosphate ester VC3419 from Mobil Chemical Co.
11. Cymel 327 is a melamine crosslinker available from American Cyanamid Co., Wayne, NJ.

We claim:

1. A process for producing an aqueous anionic polyurethane dispersion comprising
    a) dispersing a polyurethane resin having carboxylic acid groups in water in the presence of a tertiary amine; and then
    b) reacting the carboxylic acid groups on the polyurethane resin with an organic compound having at least two oxirane groups.

2. A process for producing an aqueous anionic polyurethane dispersion comprising
    a) dispersing in water, in the presence of a tertiary amine, a polyurethane resin having carboxylic acid groups, which resin is produced by reacting
        i) an organic compound having at least two reactive hydrogen functionalities and
        ii) an organic compound having at least one acid group and at least two active hydrogen functionalities with
        iii) a polyisocyanate;
    b) reacting the carboxylic acid groups on the polyurethane resin with an organic compound having at least two oxirane groups.

3. An aqueous anionic polyurethane dispersion produced according to the process of claim 1.

4. An aqueous anionic polyurethane dispersion produced according to the process of claim 2.

5. The dispersion according to claim 4, wherein the reactive hydrogen functionalities of (i) are selected from the group consisting of hydroxyl groups, amino groups and mixtures thereof.

6. The dispersion according to claim 4, wherein the organic compound (i) is a polyol having a hydroxyl functionality of from 2 to 6.

7. The dispersion according to claim 4, wherein the organic compound (i) is a polyester polyol with a hydroxyl functionality of from 2 to 3 and a molecular weight of from about 400 to about 5,000, a diol with a molecular weight of from 62 to about 400, or mixtures thereof.

8. The dispersion according to claim 4, wherein the organic compound (ii) has at least one carboxylic acid group and at least two active hydroxyl groups.

9. The dispersion according to claim 4, wherein the organic compound (ii) is a dihydroxylcarboxylic acid.

10. The dispersion according to claim 4, wherein the organic compound (ii) is selected from the group consisting of 2,2 -di(hydroxymethyl)acetic acid, 2,2 -di(hydroxymethyl) propionic acid, 2,2 -di(hydroxymethyl)butyric acid and 2,2 -di(hydroxymethyl)pentanoic acid.

11. The dispersion according to claim 4, wherein the polyisocyanate (iii) is an aliphatic or cycloaliphatic diisocyanate.

12. The dispersion according to claim 3, wherein the organic compound having at least two oxirane groups is selected from the group consisting of a diglycidyl ether of a diol or bisphenol, a triglycidyl ether of a triol, a derivative of a cyclohexene oxide and mixtures thereof.

13. The dispersion according to claim 3, wherein the organic compound having at least two oxirane groups is selected from the group consisting of a diglycidyl ether of 1,4-butanediol, neopentyl glycol, diethylene glycol, polyethylene glycol, propylene glycol, polypropylene glycol, 2,2,4-trimethyl-1,3-pentanediol, 1,6-hexanediol, cyclohexanedimethanol, bisphenol, or resorcinol; a triglycidyl ether of trimethylolethane, trimethylolpropane, or glycerine; and cyclohexene oxide derivatives with two or more oxirane groups and mixtures thereof.

14. The dispersion according to claim 3, wherein the organic compound having at least two oxirane groups is an oligomer or polymer.

15. The dispersion according to claim 3, wherein the molar ratio between the carboxylic acid groups and the oxirane groups is from about 20:1 to about 1:1.

16. The dispersion according to claim 3, wherein the reaction between the carboxylic acid groups and the oxirane groups is from about 30 percent to about 100 percent complete.

17. The dispersion according to claim 3, having a final acid number of about 0 to about 225 mg KOH/g.

18. A basecoat comprising
    a) an aqueous anionic polyurethane dispersion produced by
        i) dispersing a polyurethane resin, having carboxylic acid groups, in water in the presence of a tertiary amine and then
        ii) reacting the carboxylic acid groups on the polyurethane resin with an organic compound having at least two oxirane groups; and
    b) a crosslinker selected from the group consisting of acrylics, polyesters, alkyds, epoxies, aminoplast resins, blocked polyisocyanates and mixtures thereof.

19. A method of coating a substrate with multiple layers of a coating, comprising applying the basecoat according to claim 18 on the substrate prior to applying at least one clearcoat on said basecoat.

20. A substrate coated with at least the basecoat according to claim 18.

* * * * *